Feb. 8, 1955 R. A. MULLANEY 2,701,721

DISABLING MECHANISM FOR AUTOMATIC PHONOGRAPHS

Filed Dec. 12, 1950 2 Sheets-Sheet 1

INVENTOR.
RALPH A. MULLANEY
BY Francis W. Crotty
HIS ATTORNEY

Feb. 8, 1955 R. A. MULLANEY 2,701,721

DISABLING MECHANISM FOR AUTOMATIC PHONOGRAPHS

Filed Dec. 12, 1950 2 Sheets-Sheet 2

INVENTOR.
RALPH A. MULLANEY
BY Francis W. Crotty
HIS ATTORNEY

United States Patent Office 2,701,721

Patented Feb. 8, 1955

2,701,721

DISABLING MECHANISM FOR AUTOMATIC PHONOGRAPHS

Ralph A. Mullaney, Elmwood Park, Ill., assignor to Zenith Radio Corporation, a corporation of Illinois Application December 12, 1950, Serial No. 200,406

9 Claims. (Cl. 274—10)

This invention relates, in general, to automatic phonographs adapted to play in sequence each of a stack of record discs, and pertains more particularly to an improved mechanism for disabling the phonograph after the last of a stack of records has been played.

One prior arrangement featuring automatic shut-off comprises, in addition to the usual record-changing mechanism, a system of elements adapted to perform the disabling operation. The stop system is normally inactive, but is conditioned for operation when the final record is transferred to playing position. Upon the completion of the playing cycle for that record, the record-changing mechanism is coupled with a driving motor to effect displacement of the tone arm from engagement with the record to a record-loading position in the ordinary manner. Thereafter, the stop system is actuated to deenergize the driving motor and at the same time apply a brake to one of the members in the driving chain connecting the driving motor and the record-changing mechanism in order to maintain the tone arm at its record-loading position. Since additional elements are required in this arrangement, its production cost is objectionably high.

A solution to the cost problem is approached in another prior-art system which utilizes an existing element of the phonograph to perform a portion of the shut-off operation. The particular element is a link in the change-cycle initiating mechanism that is displaced from a record-playing position at the start of a record-changing cycle and returned thereto along a normal path at the completion of the cycle. A shut-off control member is supported for displacement from an inactive position to an active position in which it intercepts the return path of the link, being placed in its active position in response to the transfer of the last record into playing position. During the change cycle that follows the playing of the last record, the return path of the link is altered by the control member and as the link travels along its altered path, it operates a switch to deenergize the driving motor. The shut-off control member also cooperates with the tone-arm positioning system to establish the tone arm at a record-loading position at the completion of the final change cycle. This system is generally complex and is expensive to produce.

It is an object of this invention, therefore, to provide an improved phonograph having an automatic shut-off system that is less costly to produce than prior arrangements and yet is entirely efficient and reliable in operation.

A further object of the invention is to provide an automatic shut-off system for a phonograph that utilizes to the fullest extent existing elements of the record-changing mechanism.

In accordance with the invention, an automatic phonograph having a tone arm and a magazine from which record discs are sequentially transferred for playing comprises a tone-arm moving mechanism for carrying the tone arm from engagement with a record disc to a record-loading position at the start of a record-changing cycle and for returning the tone arm to a record-playing position at the completion of the cycle. The tone arm moving mechanism includes at least one component normally movable over a given path during the change cycle. Means are provided for restraining the tone arm in its record loading position and for effecting movement of the aforementioned one component along an alternate path different from its normal path, and a sensing device is employed to actuate the restraining means during a record-changing cycle following the discharge of the last of the record discs from the magazine. There is also provided a disabling device for the phonograph and an actuator for the disabling device.

The features of the present invention which are believed to be novel are set forth with particularity in the appended claims. The present invention itself, both as to its organization and manner of operation, together with further objects and advantages thereof may best be understood by reference to the following description taken in connection with the accompanying drawings in which:

Fig. 1 is a plan view, partly in block, of an automatic phonograph embodying the invention, portions of the instrument being shown cut away to reveal details of the invention;

Figs. 2 and 3 are sectional views taken along lines 2—2 and 3—3, respectively of Fig. 1;

Figures 1, 2, 3:
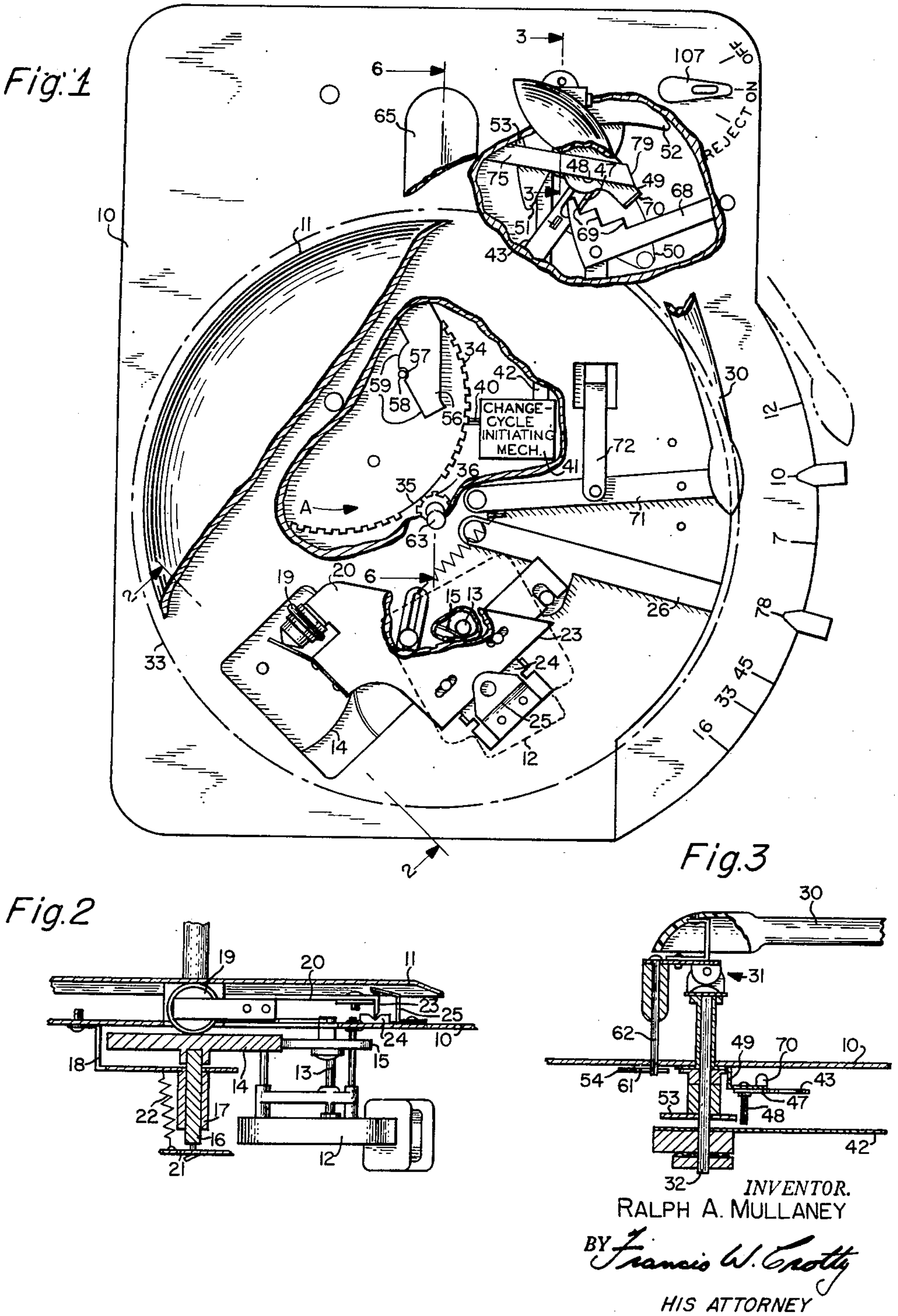

Referring now to Fig. 1, the phonograph there represented includes a mounting base 10 upon which a turntable 11 is supported for rotation. A constant-speed driving motor 12, shown in outline, is supported by base 10 beneath turntable 11 and includes a driving shaft 13 mechanically coupled to the periphery of a driving disc 14 through an idler gear 15 as shown in Fig. 2. The driving disc 14 is positioned below and parallel to turntable 11, being affixed to one end of a shaft 16 supported for rotational and axial displacement within a bearing 17. The bearing 17 is supported by a U-shaped bracket 18 and is so disposed that the rotational axis of disc 14 and shaft 16 is displaceable laterally of the axis of rotation of turntable 11. An idler wheel 19 is interposed between the adjacent surfaces of turntable 11 and disc 14 and is rotatably supported at one end of a movable plate-like carriage 20. A movable end-bearing 21 is normally in engagement with the free end of shaft 16 and a spring 22 extending between bearing 21 and member 18 biases shaft 16 vertically to urge disc 14 along its axis and complete a driving connection to the under surface of turntable 11 through idler 19.

The carriage 20 includes a downwardly projecting elongated track-engaging member 23 at the end thereof opposite idler 19. An elongated track member 24 is fixed to base 10 in the vicinity of member 23 and provides a path of movement for carriage 20 such that idler wheel 19 travels substantially in a plane including the axes of rotation of turntable 11 and disc 14. Specifically this is effected by means of a pair of upturned ears at opposite ends of member 24 which are provided with respective V-shaped notch portions for receiving the edge of member 23 to permit pivotal as well as longitudinal movement of carriage 20 with respect to track 24. A resilient member 25 of approximately Z-shaped configuration is affixed at one end to base 10 and carries at its other end a ball-like contact which engages carriage 20 directly above element 23. The resilient member 25 biases the edge of member 23 toward the apices of the V-shaped notches in member 24 to maintain a high-friction connection between track member 24 and track-engaging member 23.

A speed control lever 26 is pivoted at one end to base 10 and carries a pointer at its other end to traverse a speed scale inscribed on base 10. Lever 26 is coupled with carriage 20 through a pin and slot connection to provide means for selectively displacing the carriage along track member 24.

In operation, the rotational speed of disc 14 is constant, assuming of course that motor 12 rotates at constant speed, while the speed of turntable 11 is dependent upon the position of idler 19 in the plane including the rotational axes of turntable 11 and disc 14. Since carriage 20 is continuously movable along track 24 under control of lever 26, the operating speed of turntable 11 is continuously adjustable over a wide range of values. Thus, the user may reproduce any record at its rated speed or at the speed most pleasing to himself irrespective of the speed recommended for playing the recording. The driving system just described is generally similar to that disclosed and claimed in the copending application of Ralph A. Mullaney, Serial No. 185,180, filed September 16, 1950, now U. S. Patent No. 2,615,342, issued October 28, 1952, and assigned to the same assignee as the instant invention.

As indicated in Fig. 3, the phonograph has a tone arm 30 supported on base 10 for pivotal movement about a horizontal axis by a hinge 31 which is fixed to one end of a rotatably mounted, vertical shaft 32. The tone arm may track the groove of a record disc 33 in position on turntable 11 as represented in dash-dot outline in Fig. 1 and it may be displaced by a tone-arm moving mechanism described hereinafter as required to permit a record to be loaded on the turntable.

Figure 4:
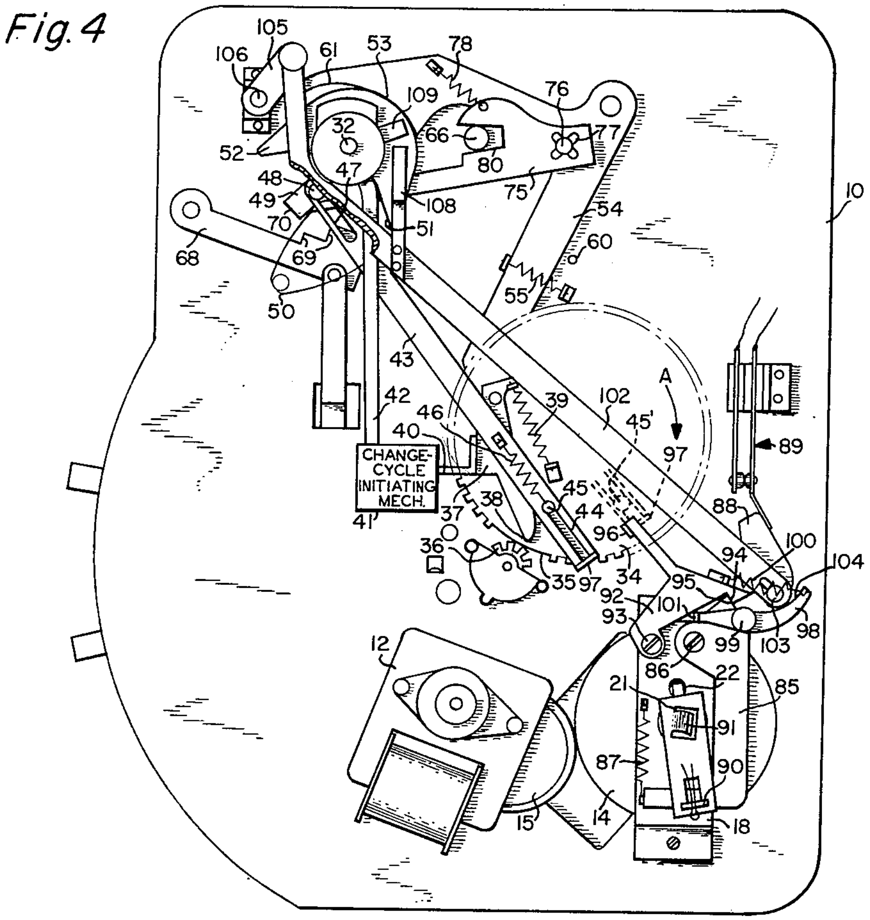
Fig. 4 represents the under side of the apparatus shown in Fig. 1.

The loading of records on the turntable is accomplished automatically by a change-cycle mechanism which, as indicated in Fig. 4, comprises a driven gear 34 rotatably supported at the under side of base 10 and having a gap or discontinuity 35 in its peripheral teeth. Normally, gap 35 is adjacent a driving gear 36 supported within an opening in base 10 below and coaxial with turntable 11 for rotation therewith. A bell crank lever 37 is pivoted at one end to the under side of gear 34 and its opposite end portion 38 is shaped essentially like one of the teeth of gear 34. A spring 39 biases crank 37 in a clockwise direction to urge tooth 38 toward the periphery of gear 34. However, an actuator 40 normally maintains lever 37 in the position shown, against the bias of spring 39, and is movable under the control of a change-cycle initiating mechanism 41 to a second position in which lever 37 is free for movement by spring 39.

The change-cycle initiating mechanism is coupled with tone-arm shaft 32 through a lever 42 and is operated in response to the completion of the playing of record 33 by the tone arm. In particular, this mechanism may be of the type which is actuated in response to an increase in tone-arm velocity as the tone arm tracks from the information carrying portion of the record groove into the terminating groove portion of high pitch. An arrangement of that type, suitable for use in the phonograph under consideration, is illustrated in the copending application of Ralph A. Mullaney, Serial No. 188,677, filed October 6, 1950, now Patent No. 2,668,058, issued February 2, 1954, and assigned to the same assignee as the instant invention.

The mechanism for moving the tone arm of the phonograph is operative to carry the tone arm from engagement with a record disc to a record-loading position at the start of a record-changing cycle and to return the tone arm to a record-playing position at the completion of the cycle. The tone-arm moving mechanism includes a crank lever or link 43 having an elongated slot 44 at one extremity which receives a pin 45 eccentrically disposed on the under side of gear 34. Pin 45 is of sufficient length that lever 43 may be supported below and clear of crank 37. A biasing spring 46 causes the pin normally to abut one end of slot 44 as shown. The opposite end of lever 43 is provided with another elongated slot 47 which receives a pin 48 fixed to one end of an arm 49 that is supported for rotation about tone arm shaft 32. A second biasing spring 50 connected to pin 48 and anchored to lever 43 causes the pin normally to abut an end of slot 47, as shown in Fig. 1. A downwardly-projecting extension of pin 48 (Fig. 3) is positioned between the legs 51 and 52 of an essentially horse-shoe shaped member 53 fixed at its bight end to shaft 32. Suitable means (not shown) are provided for braking rotational movement of tone-arm shaft 32 during a record-changing cycle to maintain adequate control of tone arm movement.

While rotation of the tone arm may be effected by displacement of lever 49, it is also necessary that the arm be lifted and lowered at the start and completion of the record-change cycle. To that end, there is provided an L-shaped tone-arm lifting lever 54 pivoted to the under side of base 10 and biased in a counterclockwise direction (Fig. 4) by a spring 55. As may be more clearly seen in Fig. 1, a portion 56 of lever 54 overlies gear 34 and has a recess or detent 57 which normally receives a pin 58 eccentrically supported on the upper surface of gear 34. Pin 58 normally maintains lever 54 against the bias of spring 55. A pair of cam surfaces 59 extending in opposite directions from recess 57 cooperate with pin 58 to displace lever 54 with suitable velocity during the tone-arm lifting and lowering portions of a record-changing cycle. A stop pin 60 fixed to the under side of base 10 limits pivotal movement of lever 54.

Figure 5:
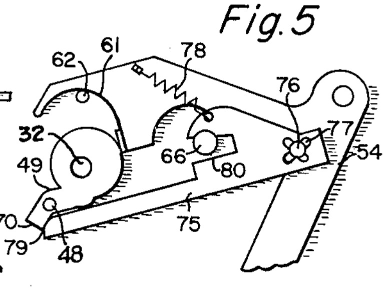
Fig. 5 represents a portion of the mechanism of Fig. 4, certain of the elements being illustrated in another operating condition.

Another portion of lever 54, shown in Fig. 5, is cut out to form a cam section 61 which is engaged by an elongated pin 62 depending from the upper portion of tone-arm hinge 31 and extending through an opening in base 10. This cam and follower arrangement provides means for effecting the usual lifting and lowering movements of the tone arm.

Figures 6, 7, 8:
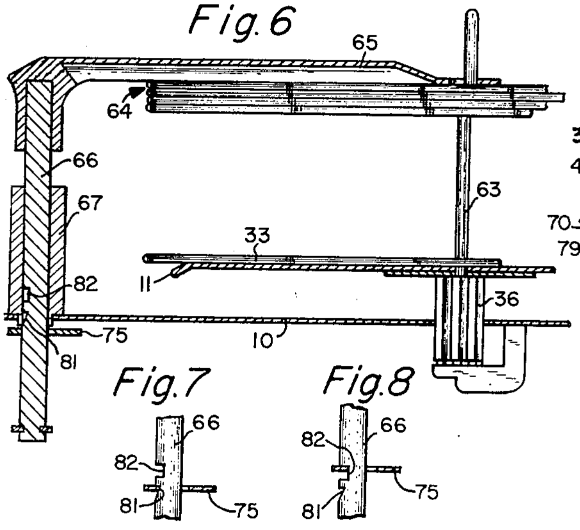
Fig. 6 is a sectional view taken along line 6—6 of Fig. 1.
Figs. 7 and 8 represent different operating conditions for a portion of the structure of Fig. 6.

The phonograph further includes a spindle 63 of the off-set type projecting upwardly from the center of turntable 11 and constituting a magazine in which a group or stack of records 64 are stored above the turntable as represented in Fig. 6. A stack leveling arm 65 is provided with an opening at one end for receiving the upper portion of spindle 63 and is affixed at its other end to one extremity of a shaft 66, supported for rotational and axial displacement by a standard 67. Arm 65 normally abuts the last or uppermost record of stack 64, as shown. The customary record ejector is coupled by means (not shown) to segmented gear 34 for actuation thereby and may be of the type that is included within the structure of spindle 63. An ejector suitable for use in the phonograph under consideration, is illustrated in the copending application of Ralph A. Mullaney, Serial No. 121,973, filed October 18, 1949, now Patent No. 2,652,257, issued September 15, 1953, and assigned to the same assignee as the instant invention.

The records stored in the magazine may be of any of a variety of sizes so that the restored position of the tone arm at the completion of a record-changing cycle must be correlated to the record size. For that purpose there is provided an adjustably fixed record-size control 68 (Fig. 1) pivoted at one end to the under side of base 10 and having at the other end a series of steps 69. The selective displacement of member 68 introduces any one of the steps 69 in the path of movement of a finger 70 projecting upwardly from the free extremity of arm 49 to determine the restored position of the tone arm. As illustrated, lever 68 has three operating positions related to record disc diameters of 7, 10 and 12 inches respectively, although any other number of steps may be provided. An actuating lever 71 is pivoted at one end to the upper side of base 10 and carries at its other end a pointer arranged to traverse a record-size scale inscribed on the mounting base. Actuator 71 is coupled with lever 68 by an elongated link 72 and provides means for selectively actuating size control 68 to any of its operating positions.

The arrangement as thus far described comprises an automatic phonograph having a record-tracking tone arm and a magazine from which record discs are sequentially transferred for playing. In setting up the phonograph for operation, lever 71 is manipulated to place its pointer at the appropriate calibration of the record diameter scale and to set control 68 into a corresponding operating position. Speed control 26 is operated to place its pointer at the required calibration of the speed scale and locate idler 19 into an associated operating position. As illustrated in Fig. 1, the record size indicator 71 is disposed adjacent the scale marking corresponding to a record diameter of 10 inches and control 68 is positioned so that the intermediate one of the steps 69 is in operative position. The speed indicator 26 is set to 78 R. P. M. and idler 19 is positioned so that turntable 11 is driven at that speed.

In order to load record discs into the magazine constituted by spindle 63, leveling arm 65 is manually lifted until its free end is clear of the spindle and it is then rotated away from the spindle. The records to be played are then threaded onto the upper portion of spindle 63 and the lowermost of these rests upon the shoulder formed at the spindle off-set. Thereafter, arm 65 is returned toward its normal position and is allowed to drop onto the topmost record of the stack.

Let it now be assumed that motor 12 is energized and that turntable 11 is rotated at the selected speed. Further, consider that a record is in position on the turntable and that tone arm 30 is tracking the information-carrying portion of the record groove. At the completion of the record-playing cycle, the tone arm tracks into the terminating, high-pitch portion of the record and a record-changing cycle is initiated by mechanism 41 which responds to this movement of the tone arm. At the start of this cycle, bell crank 37 is released and a driving connection is established between driving gear 36 and the segmented, single-revolution gear 34. Gear 34 rotates in the direction of arrow A (Fig. 1) and pin 58 is displaced out of recess 57 of the tone-arm lifting lever 54. Under the action of spring 55, and the speed control exercised by the cam-following function of pin 58 against cam surface 59, lever 54 rotates in a counterclockwise direction (Figs. 4 and 5) and cam section 61 displaces pin 62 to pivot the tone arm 30 about the axis of hinge 31, thereby lifting the tone arm 30 from the record groove. Rotation of lever 54 is arrested when it engages stop pin 60.

Concurrently with the movement of pin 58, pin 45 (Fig. 4) drives lever 43 to rotate arm 49 in a counterclockwise direction (Fig. 1) with respect to shaft 32. Pin 48 engages leg 52 and rotates member 53 in a counterclockwise direction, thereby displacing tone arm 30 away from spindle 63 to a record-loading position, shown in dash-dot-dot outline, clear of the largest size record that is to be accommodated by the phonograph. At this point in the record-changing cycle, the crank action of pin 45 and lever 43 causes the displacement of lever 43 to be reversed (to move away from shaft 32) as gear 34 continues its single-revolution cycle. The record ejector (not shown) is operated, to discharge the lowermost record of stack 64 which falls atop disc 33, during the period in which pin 48 travels from leg 52 into engagement with leg 51 to rotate member 53 and tone arm 30 in a clockwise direction. Tone arm 30 thus is driven toward spindle 63 and comes to rest when finger 70 of member 49 engages the intermediate one of steps 69.

In this last portion of the record-changing cycle, pin 58 engages one of the cam surfaces 59 of lever 54 and the lever is rotated to cause cam surface 61 and pin 62 to lower the tone arm at the starting section of the groove of the new record disc as gear 34 rotates toward its rest position. At this time the engagement of step 69 by finger 70 limits movement of link 43 in its traverse away from shaft 32 but the slot 44 and pin 45 provide lost motion so that gear 34 may complete its operating cycle regardless of the limit of movement imposed on lever 43 by the conjoint action of record-size control 68 and finger 70. At the completion of the record-change cycle, actuator 40 displaces lever 37 to its inactive position and finally pin 58 detents with recess 57 of the tone arm lifting lever 54.

The pin and slot connections 44, 45 and 47, 48 provide lost motion in the mechanical coupling between gear 34 and member 49 so that when tone arm 30 is displaced in response to the rotation of gear 34 and the displacement of lever 49, a mechanically rigid connection is not established. If during a record-changing cycle, the tone arm is manually arrested or displaced in a direction opposite to that effected by the record-changing mechanism, lost-motion connections 44, 45 or 47, 48 permit gear 34 of the record-changing mechanism to continue its cycle of rotation without interruption. Consequently, these lost-motion connections prevent "jamming" of the machine by inadvertent manipulation of the tone arm during a record-changing cycle.

The phonograph includes a mechanism for effecting automatic shut-off following the playing cycle of the last record in the record magazine. As shown in Fig. 4, the shut-off mechanism comprises a stop lever 75 pivotally connected to lever 54 at 76. A friction washer 77 maintains a high-friction connection between the levers so that lever 75 moves with lever 54, but is displaceable relative thereto. A spring 78 extends between the levers to bias lever 75 about pivot 76 only when it is displaced relative to lever 54. The free extremity 79 of lever 75 (Fig. 1) is out of the path of finger 70 of lever 49 when lever 75 is in an inactive position. Under certain conditions, lever 75 is displaceable in response to movement of lever 54 toward an action position, illustrated in Fig. 5, in which its end 79 is engaged by finger 70 on the return stroke of member 49. Lever 75 thus constitutes means for restraining movement of tone-arm lever 49 to retain the tone arm substantially at its record-loading position and, as will be more apparent from the discussion to follow, this means operates during a record-changing cycle following the discharge of the last record of the magazine.

The function of lever 75 in engaging member 49 is analogous to that resulting from the engagement of portion 70 of member 49 with a step 69 of the record-size control 68 in the ordinary record-changing cycle. That is, in each instance movement of lever 43 in a direction away from shaft 32 is arrested at some limiting position and the driving gear 34 requires the lost motion of pin 45 and slot 44 to complete its single revolution. However, when lever 75 limits the movement of link 43, it functions earlier in the record-changing cycle than the record-size control 68 and accordingly more lost motion is involved when lever 75 operates as a limit device. The path of link 43 for that condition is altered materially from that of the usual record-changer cycle.

The lever 75 includes a slot 80 which receives the lower portion of shaft 66 of the record leveling arm 65. As shown in Fig. 6, shaft 66 has a first recessed section 81 which descends to the level of lever 75 upon the discharge of the penultimate record of the stack 64. As will be explained hereinafter, this recessed section prevents leveling arm 65 from dropping until the completion of the change cycle in which the last record of the stack is delivered to the turntable. A second and deeper recess 82, is provided in shaft 66 above recess 81 to permit displacement of lever 75 into its actuated position during a change cycle following the playing of the final record of the stack.

The phonograph further includes a disabling device which, as shown in Fig. 4, comprises a carriage 85 pivoted at 86 to bracket 18 and biased in a clockwise direction by a spring 87 although a locking device, presently to be described, prevents the spring from moving the carriage. Carriage 85 includes a portion 88 for operating a normally closed switch 89 in the motor energizing circuit (not shown), when the carriage is displaced by spring 87. Carriage 85 has a downward extension 90 which serves as a pivotal support for the end bearing 21 referred to previously in the description of the driving system of the phonograph. The bearing member is supported to be laterally displaced with carriage 85 and it has a downwardly inclined cam surface 91 so that when the bearing 21 is displaced, shaft 16 rides down cam surface 91.

The disabling device is provided with an actuator 92 pivoted to bracket 18 at 93 and having a shoulder or locking surface 94 which engages a cooperating locking shoulder 95 of carriage 85 to maintain the carriage against the bias of spring 87. An extension of actuator 92 carries an upwardly turned ear 96 that is disposed in the path of a downward projection 97 at one extremity of link 43 when link 43 is displaced along its modified path during the change cycle following the playing of the last record. The disposition of ear 96 is such that regardless of which of the steps 69 of size control 68 is effective, it is contacted by projection 97 of link 43 only during a record-change cycle initiated after the last record of stack 64 has been played.

In addition to the afore-described mechanism for accomplishing automatic shut off after the stack of records has been played, the phonograph includes components to permit manual operation. More specifically, a trip member 98 is pivoted to carriage 85 at 99 and is biased in a counterclockwise direction by a spring 100 extending between the trip member and actuator 92. An upwardly turned portion 101 of member 98 provides a stop for limiting counterclockwise rotation and for engaging actuator 92 when the trip member is displaced against the bias of spring 100. A link 102 is connected to carriage 85 at 103 by a pin and slot connection and its end portion 104 is in incipient engagement with trip member 98. The other extremity of link 102 is pivoted to one end of a lever 105, the other end of which is fixed to a shaft 106 extending upwardly through base 10 and carrying at its other end a control handle 107 (Fig. 1).

An extension 108 of link 102 is positioned in the vicinity of an extension 109 of lever 42 which couples the tone-arm shaft 32 with initiating mechanism 41. The components 108 and 109 constitute a reject mechanism for initiating a record-changing cycle during the playing of a record and at the option of the user.

In considering the operation of the automatic shut-off mechanism, let it be assumed that control handle 107 is in its "on" position, placing the shut-off mechanism in operating condition represented in Fig. 4, and the phonograph is playing some record other than the last or next to the last record of stack 64. After the completion of a playing cycle, a record-changing cycle is initiated and carried out in the manner described hereinbefore. During that cycle, shaft 66 prevents lever 75 from assuming its actuated or shut-off position and another record is fed from the stack onto the turntable in the usual manner for playing. This sequence of operations is continued for each record of the magazine, with shaft 66 being progressively lowered as a result of the discharge of the records.

In the record-changing cycle following the playing of the penultimate record, recess 81 of shaft 66 is adjacent lever 75. Consequently, during the cycle in which the final record of the stack is fed to the turntable, lever 75 is displaced in response to counterclockwise rotation of lever 54 and enters recess 81 as shown in Fig. 7. Although shaft 66 tends to drop as the last record is discharged from the magazine, its descent is arrested by the presence of lever 75 in recess 81. At the same time, the relatively shallow recess 81 does not permit lever 75 to progress to its active or shut-off position and the usual change cycle is carried out as required to feed the final record to the turntable. At the completion of the rceord-changing cycle, lever 54 is returned to the position shown and stop lever 75 is carried therewith to its normal position, allowing shaft 66 to descend to an ultimate position in which the abutment formed at the shaft end of leveling arm 65 engages the top of standard 67. In this final position of shaft 66, recess 82 is adjacent lever 75.

During the record-changing cycle which follows the playing of the last record, lever 75 is displaced with lever 54 and enters recess 82 as shown in Fig. 8, thereby permitting lever 75 to proceed to its shut-off position illustrated in Fig. 5, in which the end 79 is in the path of finger 70 of lever 49. As a result the return movement of lever 49 is arrested by stop lever 75, and the tone arm is retained essentially in its record-loading position. In addition, the path of movement of link 43 (Fig. 4), as previously explained, is altered, so that near the completion of a cycle of gear 34 the link passes through the position shown in dash outline designated 45' in which its projection 97 engages ear 96 of actuator 92. Consequently, actuator 92 is rotated against the bias of spring 100 to open lock 94, 95 and spring 87 displaces carriage 85. The carriage extension 88 opens motor switch 89 and, since bearing member 21 is displaced with the carriage, shaft 16 rides down incline 91 to break the driving connection between disc 14 and turntable 11. The movement of carriage 85 also displaces link 102 and control handle 107 is carried to its "off" position.

In order to return the machine to operative condition, control handle 107 is displaced to its "on" position which rotates carriage 85 in a counterclockwise direction to close switch 89 and return the proper bearing portion of element 21 to the end of shaft 16 completing a driving connection to the turntable. At the same time, actuator 92 is displaced by carriage 85 to a position in which lock 94, 95 releasably locks the system in operating condition.

To perform a reject operation, control handle 107 is moved to its "reject" position which effects displacement of link 102 in the general direction of shaft 106 and extension 108 of the link engages projection 109 of lever 42. Accordingly, the change-cycle initiating mechanism 41 is operated and the record-changing cycle described earlier is carried out.

For manually disabling the phonograph, control handle 107 is displaced to its "off" position to drive link 102 in the direction opposite to that described in connection with the reject operation. Extremity 104 of link 102 engages and rotates trip member 98 clockwise about its pivot 99 causing projection 101 to engage actuator 92 and displace the actuator in a counterclockwise direction about its pivot 93. This opens lock 94, 95 and spring 87 rotates carriage 85 to deenergize the motor circuit and decouple the turntable and driving disc 14 in the manner described in connection with automatic shut-off.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. An automatic phonograph having a tone arm and a magazine from which record discs are sequentially transferred for playing comprising: a tone-arm moving mechanism for carrying said tone arm from engagement with a record disc to a record-loading position at the start of a record-changing cycle and for returning the tone arm to a record-playing position at the completion of said cycle, said mechanism including at least one component normally movable along a given path during said change cycle; means for restraining said tone arm in its record loading position and for effecting movement of said one component along an alternate path different from said given normal path; a sensing device for actuating said means during a record changing cycle following the discharge of the last of said record discs from said magazine; a disabling device for said phonograph; and an actuator for said device disposed in said alternate path.

2. An automatic phonograph having a tone arm and a magazine from which record discs are sequentially transferred for playing comprising: a tone-arm moving mechanism for carrying said tone arm from engagement with a record disc to a record-loading position at the start of a record-changing cycle and for returning the tone arm to a record-playing position at the completion of said cycle, said mechanism including a tone-arm moving lever rotatably supported at one end, a driver operable during a record-changing cycle and a link extending between said driver and the free end of said lever in driving connection therebetween, said link being normally movable along a given path during said change cycle; means for restraining said tone arm in its record-loading position and for effecting movement of said link along an alternate path different from said given normal path; a sensing device for actuating said means during a record changing cycle following the discharge of the last of said record discs from said magazine; a disabling device for said phonograph; and an actuator for said device disposed in said alternate path of said link.

3. An automatic phonograph having a tone arm and a magazine from which record discs are sequentially transferred for playing comprising: a tone-arm moving mechanism for carrying said tone arm from engagement with a record disc to a record-loading position at the start of a record-changing cycle and for returning the tone arm to a record-playing position at the completion of said cycle, said mechanism including a tone-arm moving lever rotatably supported at one end, a driver operable during a record-changing cycle and a link extending between said driver and the free end of said lever in driving connection therebetween, said link being normally movable along a given path during said change cycle; means for arresting movement of said tone-arm moving lever to restrain said tone arm in its record-loading position and for effecting movement of said link along an alternate path different from said given normal path; a sensing device for actuating said means during a record changing cycle following the discharge of the last of said record discs from said magazine; a disabling device for said phonograph; and an actuator for said device disposed in said alternate path of said link.

4. An automatic phonograph having a tone arm and a magazine from which record discs are sequentially transferred for playing comprising: a tone-arm moving mechanism for carrying said tone arm from engagement with a record disc to a record-loading position at the start of a record-changing cycle and for returning the tone arm to a record-playing position at the completion of said cycle, said mechanism including a tone-arm moving lever rotatably supported at one end, a driver operable during a record-changing cycle and a link extending between said driver and the free end of said lever in driving connection therebetween, said link being normally movable along a given path during said change cycle; means for arresting movement of said tone-arm moving lever to restrain said tone arm in its record-loading position and for effecting movement of said link along an alternate path different from said given normal path; a sensing device for actuating said means during a record changing cycle following the discharge of the last of said record discs from said magazine; lost-motion means included in the connection between said driver and said tone-arm moving lever for permitting said link to traverse a said alternate path when said tone-arm moving lever is arrested by said first-mentioned means; a disabling device for said phonograph; and an actuator for said device disposed in said alternate path of said link.

5. An automatic phonograph having a tone arm and a magazine from which record discs are sequentially transferred for playing comprising: a tone-arm moving mechanism for carrying said tone arm from engagement with a record disc to a record-loading position at the start of a record-changing cycle and for returning the tone arm to a record-playing position at the completion of said cycle, said mechaism including a tone-arm moving lever rotatably supported at one end, a rotatable driver operable during a record-changing cycle, a pin eccentrically fixed to said driver, a link pivoted at one extremity to the free end of said lever and having a slot at the opposite extremity receiving said pin and spring means fixed to said pin and to said link biasing said pin against one end of said slot; means for arresting movement of said tone-arm moving lever to restrain said tone arm in its record-loading position and to effect movement of said link along an alternate path different from said given normal path; a sensing device for actuating said means during a record changing cycle following the discharge of the last of said record discs from said magazinc; a disabling device for said phonograph; and an actuator for said device disposed in said alternate path of said link.

6. An automatic phonograph having a tone arm and a magazine from which record discs are sequentially transferred for playing comprising: a tone-arm moving mechanism for carrying said tone arm from engagement with a record disc to a record-loading position at the start of a record-changing cycle and for returning the tone arm to a record-playing position at the completion of said cycle, said mechanism including a tone-arm moving lever rotatably supported at one end, a rotatable driver operable during a record-changing cycle, a pin eccentrically fixed to said driver, a link pivoted at one extremity to the free end of said lever and having a slot at the opposite extremity receiving said pin and spring means fixed to said pin and to said link biasing said pin against one end of said slot; means for arresting movement of said tone-arm moving lever to restrain said tone arm in its record-loading position and for causing said pin to travel along said slot against the bias of said spring means to effect movement of said link along an alternate path different from said given normal path; a sensing device for actuating said means during a record changing cycle following the discharge of the last of said record discs from said magazine; a disabling device for said phonograph; and an actuator for said device disposed in said alternate path of said link for operating said disabling device before said driver has completed a cycle of operation.

7. An automatic phonograph having a tone arm and a magazine from which record discs are sequentially transferred for playing comprising: a tone-arm moving mechanism for carrying said tone arm from engagement with a record disc to a record-loading position at the start of a record-changing cycle and for returning the tone arm to a record-playing position at the completion of said cycle, said mechanism including at least one component normally movable along a given path during said change cycle; a stop element movable during each record-changing cycle from an inactive toward an active position for restraining said tone arm in its record-loading position and for effecting movement of said one component along an alternate path different than said given normal path; record-stack engaging means normally in engagement with the last record of said magazine and having a portion preventing movement of said stop element, but displaceable with the discharge of the last record of said magazine to a position permitting movement of said element to its aforesaid active position; a disabling device for said phonograph; and an actuator for said device disposed in said alternate path.

8. An automatic phonograph having a tone arm and a magazine from which record discs are sequentially transferred for playing comprising: a tone-arm moving mechanism for carrying said tone arm from engagement with a record disc to a record-loading position at the start of a record-changing cycle and for returning the tone arm to a record-playing position at the completion of said cycle, said mechanism including at least one component normally movable along a given path during said change cycle; a stop element movable during each record-changing cycle from an inactive toward an active position for restraining said tone arm in its record-loading position and for effecting movement of said one component along an alternate path different from said given normal path; a record-stack engaging member normally in engagement with the last record of said magazine; a movable support for said record-stack engaging member including a portion preventing movement of said stop element having a first recess disposed to be positioned prior to the initiation of a record-changing cycle for the last record of said magazine to receive said stop element and prevent movement of said support during the discharge of the last record and a second recess disposed to be positioned with the discharge of the last record of said magazine to receive said stop element and permit movement of said element to its aforesaid active position; a disabling device for said phonograph; and an actuator for said device disposed in said alternate path.

9. An automatic phonograph having a tone arm and a magazine from which record discs are sequentially transferred for playing comprising: a tone arm moving mechanism for carrying said tone arm from engagement with a record disc to a record loading position at the start of a record-changing cycle and for returning the tone arm to a record-playing position at the completion of said cycle; said mechanism including at least one component normally movable along a given path during said change cycle; means for restraining said tone arm in its record loading position and for effecting movement of said one component along an alternate path different from said given normal path; a sensing device for actuating said means during a record changing cycle following the discharge of the last of said record discs from said magazine; a mechanical driving system including a series of at least three rotatable and frictionally engaged elements, one end element of said series being displaceable to release its frictional engagement with the intermediate element of said series; a disabling device for said phonograph mechanically connected to said driving system; and an actuator for said device disposed in said alternate path.

References Cited in the file of this patent

UNITED STATES PATENTS

| | | |
|---|---|---|
| 2,330,383 | Roe | Sept. 28, 1943 |
| 2,480,623 | Ballentine et al. | Aug. 30, 1949 |
| 2,486,898 | Wennerbo | Nov. 1, 1949 |
| 2,545,643 | Bender | Mar. 20, 1951 |
| 2,563,649 | Hartman | Aug. 7, 1951 |

FOREIGN PATENTS

| | | |
|---|---|---|
| 451,846 | Great Britain | Aug. 4, 1936 |
| 606,458 | Great Britain | Aug. 13, 1948 |